UNITED STATES PATENT OFFICE.

FABIEN JOURDES, OF PARIS, FRANCE.

IMPROVEMENT IN ANTISEPTIC COMPOSITIONS.

Specification forming part of Letters Patent No. 199,209, dated January 15, 1878; application filed November 1, 1877.

*To all whom it may concern:*

Be it known that I, FABIEN JOURDES, of Paris, France, have invented a new and useful Improvement in Preserving Animal and Vegetable Matters; and I do hereby declare that the following is a full, clear, and exact description of the same.

My invention consists in an improved compound for preserving animal matters, such as greases, meats, butter, milk, fish, and leather, and also vegetable substances, such as oils and fruits.

The compound consists of equal parts of bisulphate of alumina and potash, or alum, pure sulphate of lime, and biborate of soda, or trade borax, the same being applied by sprinkling, coating, or impregnating the matters to be preserved with a dry mixture of the said salts, previously reduced to an impalpable powder, or by treating the substances in a solution of the same.

In carrying out my invention, the powdered compound is, when solids are to be preserved, sprinkled upon the same so as to form a coating. For preserving such substances as butter, the mass is to be mixed with a small quantity of the above-mentioned salts, and the surface in contact with the outer air is to be covered with a slight coating. When the butter is to be preserved for a short time only, it may be enveloped in a sheet of unsized paper, (filtering-paper,) previously dipped into a concentrated solution of the three salts.

For preserving liquids, such as milk, &c., a small quantity of the powder is dissolved in the same.

Eggs are preserved by being plunged into a concentrated solution of the three salts, after which they will keep fresh for several months.

I am aware of the fact that alum and borax have been heretofore used in connection with each other in preserving compounds, and also that powdered sulphate of lime has heretofore been used for preserving purposes. I therefore lay no claim to either separately, but only when used in combination with each other, in the proportions stated.

Having thus described my invention, what I claim as new is—

The compound for preserving animal and vegetable substances, consisting of a mixture of alum, or bisulphate of alumina and potash, pure sulphate of lime, and the biborate of soda, or trade borax, in about equal proportions, as described.

FABIEN JOURDES.

Witnesses:
   ROBT. M. HOOPER,
   EUGENE HÉLERT.